April 23, 1963
W. S. RAYNOR
3,086,636
PARCEL SORTATION SYSTEM
Filed May 26, 1959
9 Sheets-Sheet 1
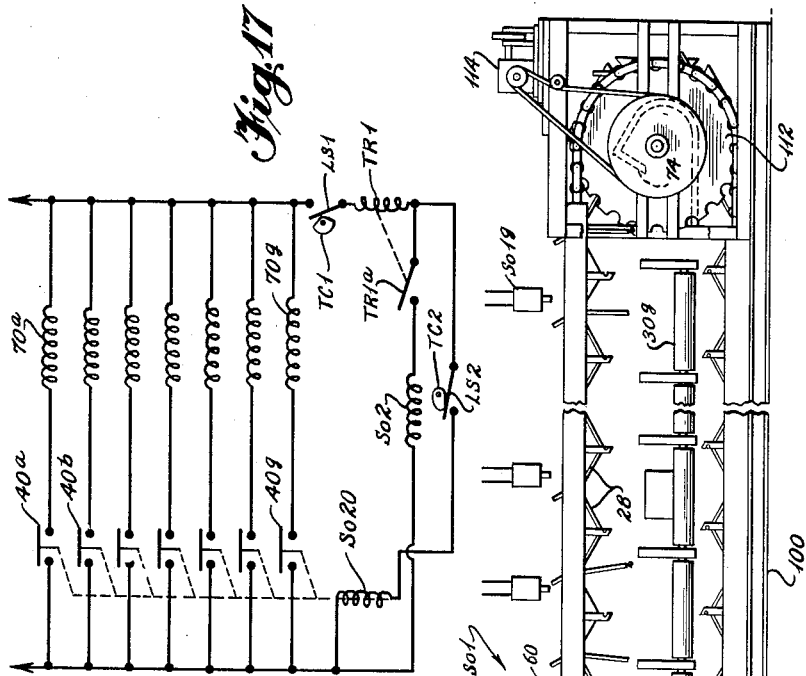
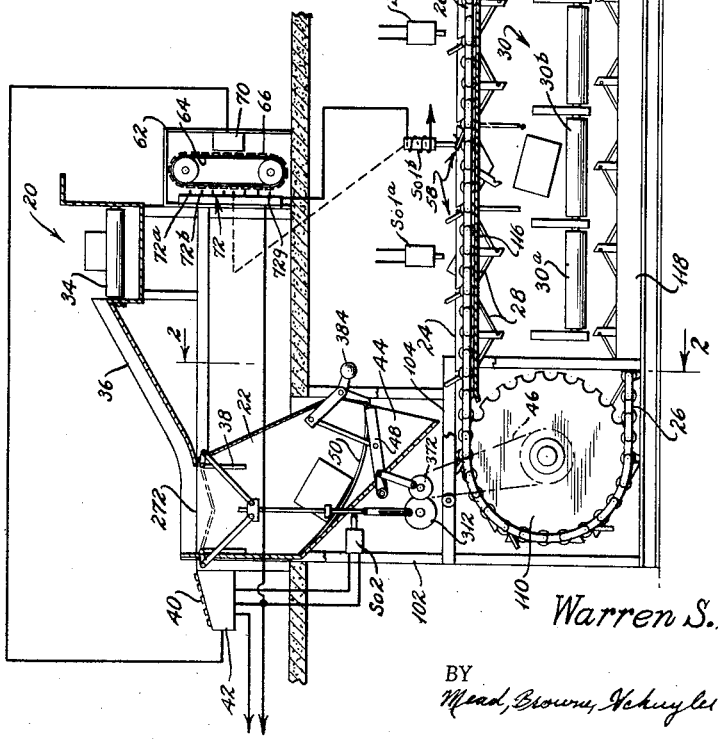
INVENTOR
Warren S. Raynor
BY
Mead, Browne, Schuyler & Beveridge
ATTORNEYS April 23, 1963   W. S. RAYNOR   3,086,636
PARCEL SORTATION SYSTEM
Filed May 26, 1959   9 Sheets-Sheet 2

INVENTOR
Warren S. Raynor
BY
Mead, Browne, Schuyler & Beveridge
ATTORNEYS

April 23, 1963

W. S. RAYNOR 3,086,636

PARCEL SORTATION SYSTEM

Filed May 26, 1959

INVENTOR
Warren S. Raynor

BY
Mead, Browne, Schuyler & Beveridge
ATTORNEYS

April 23, 1963 W. S. RAYNOR 3,086,636
PARCEL SORTATION SYSTEM
Filed May 26, 1959 9 Sheets-Sheet 4
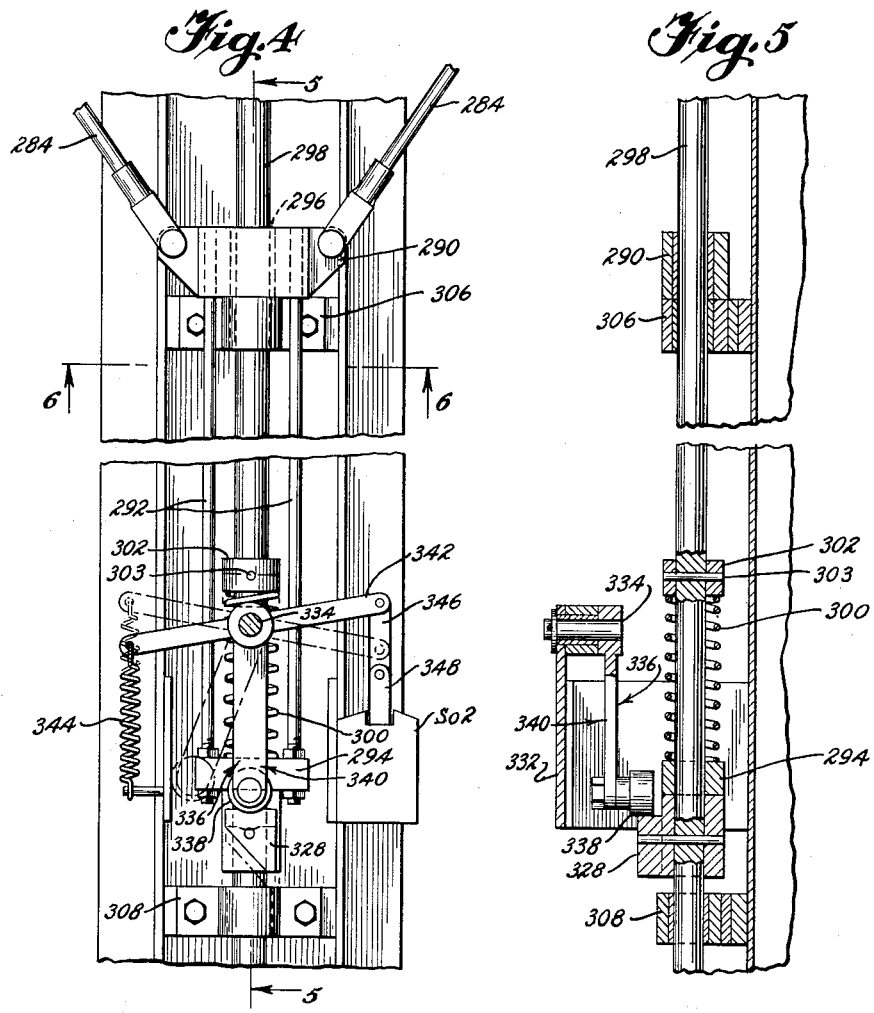
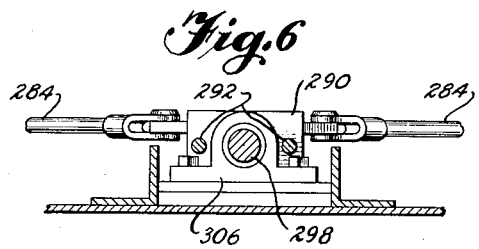
INVENTOR
*Warren S. Raynor*
BY
*Mead, Browne, Schuyler & Beveridge*
ATTORNEYS

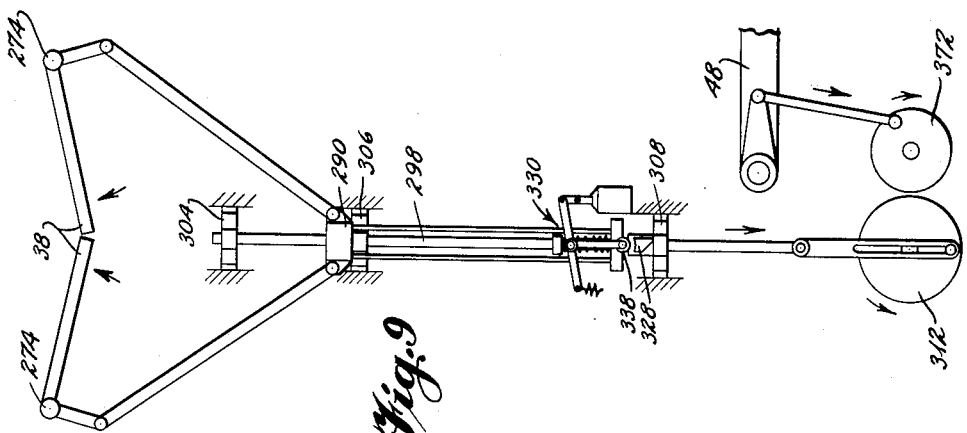
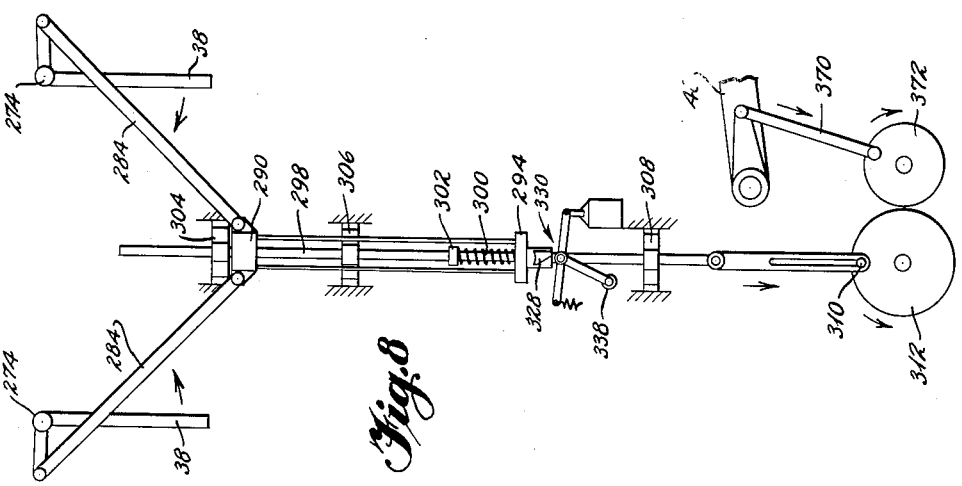
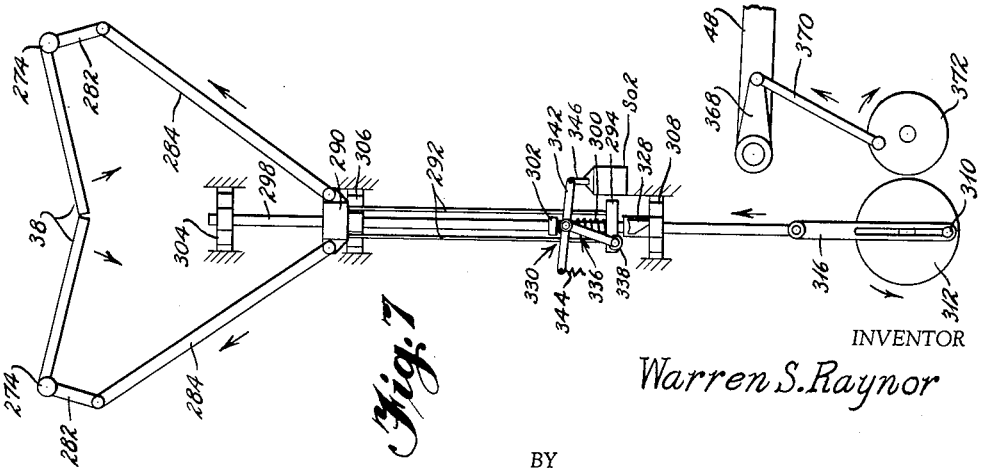

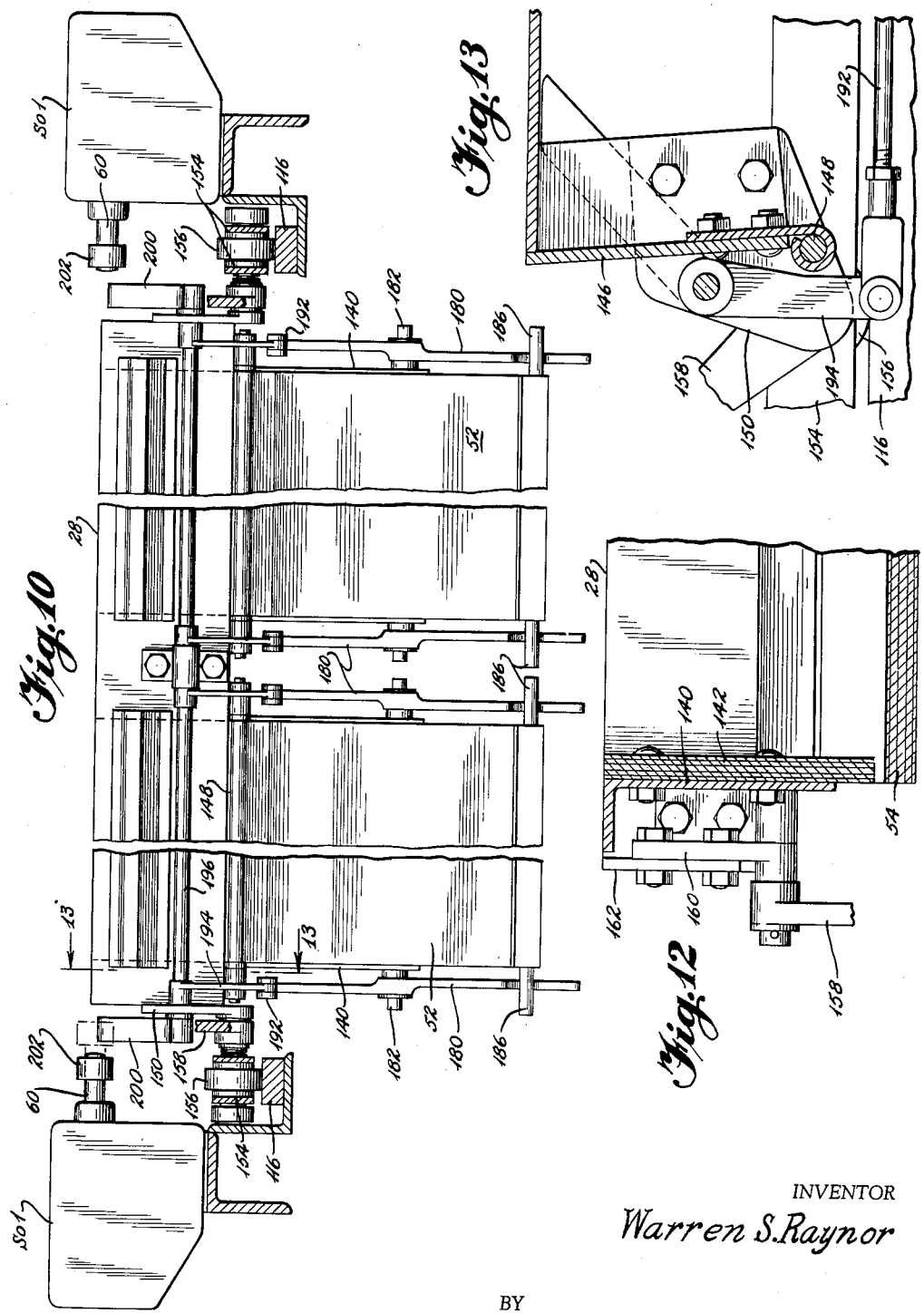

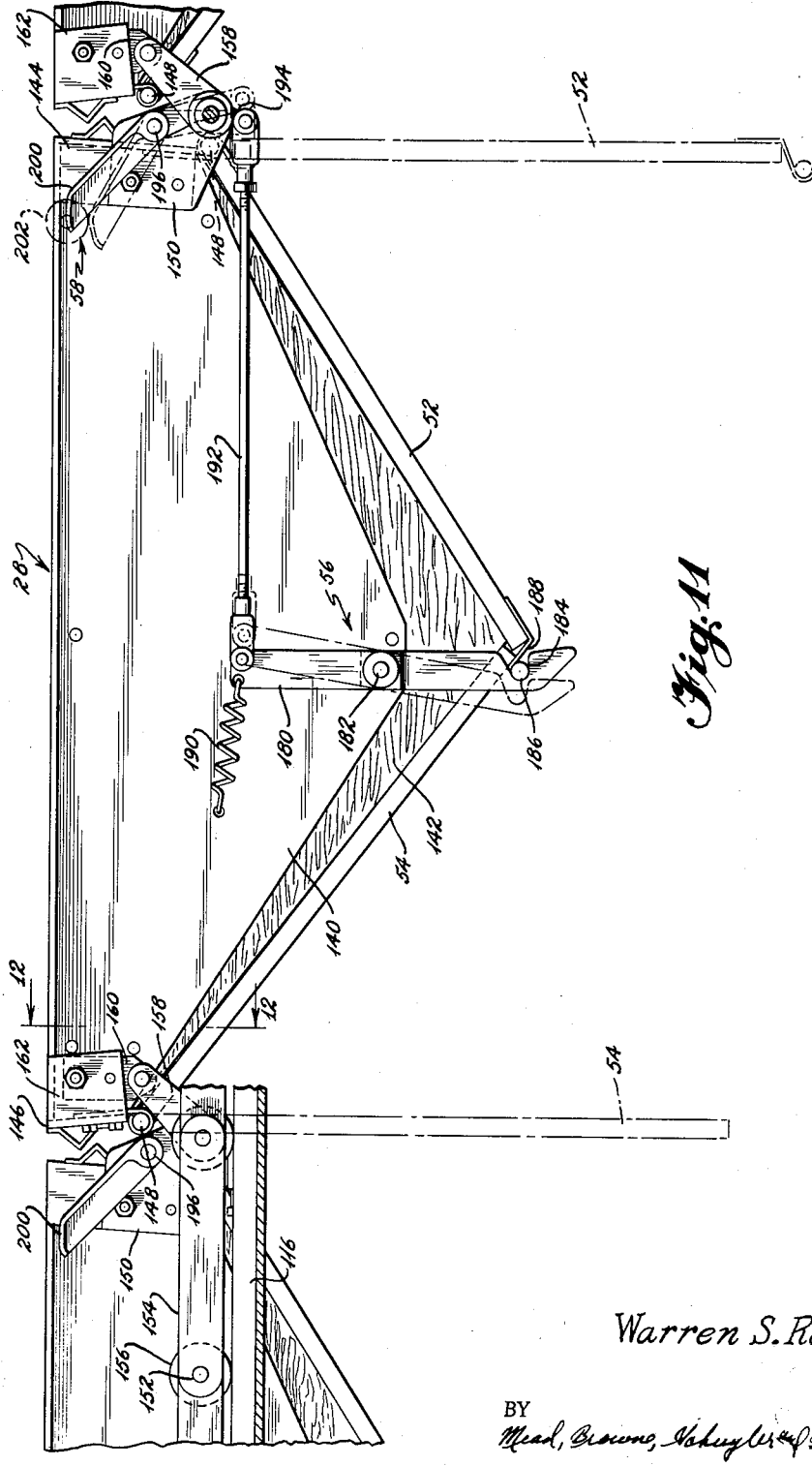

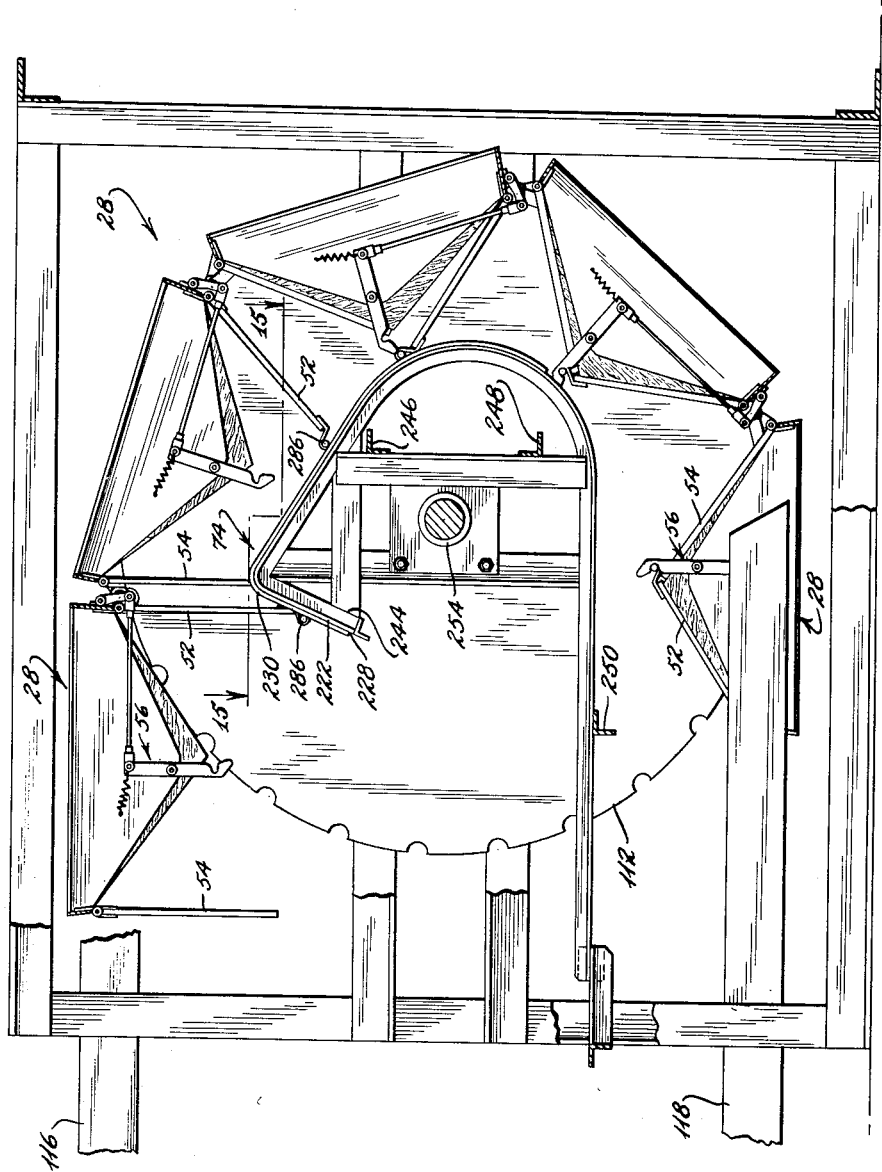

April 23, 1963 W. S. RAYNOR 3,086,636
PARCEL SORTATION SYSTEM
Filed May 26, 1959 9 Sheets-Sheet 9

INVENTOR
Warren S. Raynor
BY
Mead, Browne, Schuyler & Beveridge
ATTORNEYS

United States Patent Office 3,086,636
Patented Apr. 23, 1963

3,086,636
PARCEL SORTATION SYSTEM
Warren S. Raynor, Port Hope, Ontario, Canada, assignor to Mathews Conveyor Company, Ellwood City, Pa., a corporation of Pennsylvania
Filed May 26, 1959, Ser. No. 815,918
4 Claims. (Cl. 198—26)

This invention relates to systems for distributing and sorting articles into categories and particularly concerns a parcel sortation system of the type used in post offices and department stores for sorting packages into groups for distribution to different destinations.

In systems of this type, articles are delivered to a sorting station where an operator observes the destination marked on the parcel, places the parcel on a trap door and actuates a selecting mechanism. This opens the door, drops the parcel down a chute to a receiving cradle which deposits the parcel into a bucket on an endless conveyor. According to the destination selected by the operator, the parcel remains in the bucket until it reaches a selected discharge point where trap doors in the bucket open and deposit the parcel on a collecting conveyor.

A major object of this invention is to improve the dispatching apparatus at the sorting station to enable the operator to handle more parcels by increasing the speed of operation of the door opening and closing mechanism. Additionally, an object of the invention is to provide a quick operating mechanism for the trap door which is periodically conditioned for operation in synchronism with movement of the bucket conveyor.

Another object of the invention is to operate the trap door mechanism and the loading cradle synchronously with the movement of the bucket conveyor without causing the door to flutter and without imparting to the bucket conveyor pulsations resulting from the oscillation of those mechanisms.

A further object of the invention is to mount the bucket on an endless roller chain conveyor having a pitch shorter than the length of the bucket and supported on sprockets the teeth of which have a pitch shorter than the length of the bucket.

A further object of the invention is to provide a cam insuring the closing of the doors at the bottom of the bucket even though those doors may be swinging haphazardly as the bucket approaches the end of the conveyer.

In the attainment of the objects an important feature of the invention resides in the control of a latch retaining the trap door at a dispatch station in closed position by periodically conditioning the latch operating mechanism for opening the latch synchronously with the movement of the bucket conveyer and effecting operation of the latch during the period of such condition by operation of a selection mechanism. Also, a feature of the invention resides in the operation of the trap door mechanism at a higher speed than the cradle for depositing parcels in the buckets with both the trap doors and the cradle being operated in synchronism with movement of the bucket conveyer. Transmission of pulsations from these oscillating mechanisms to the continuously moving endless conveyer is avoided by a lost motion connection in the door operating mechanism which controls opening and closing of the doors in synchronism with the conveyer upon release of the latch but is ineffective to operate the doors when the latch is engaged and also a counterweight for the oscillating rocker arm of the cradle which is continuously operated but properly balanced to apply a substantially uniform load to the mechanism.

In using buckets of a given length with a chain of shorter pitch, another feature of the invention resides in the pivotal mounting of one end of a bucket to an axis of a roller and pivotally connecting a link to the other end of the bucket and to the axis of another roller spaced more than one pitch from the first roller. With this arrangement, the bucket moves out of its normal plane of travel with respect to the conveyer chains as the chains pass around the short pitched sprockets, the link connecting one end of the bucket enabling the bucket to move in such a manner.

For purposes of insuring closing of the trap doors as the buckets move around a sprocket at the end of the conveyer, a cam or a series of cams are arranged to engage projections from the trap door at the forward end of the bucket. These cams each have a shoulder inclined upwardly toward the end of the conveyer for engaging a projection on a bucket door regardless of how violently the door may be swinging. As the bucket moves with the chain, the door projection slides up this shoulder to a downwardly inclined positioning portion of the cam which extends over the axis of the sprocket and stabilizes movement on the projection on the door in position to move along a closing portion of the cam having a surface moving toward the bucket and extending in an arc around the axis of the sprocket to move the door to closed position as the bucket moves to the lower part of the sprocket.

These and other objects and advantages of the invention will become apparent from the following specification taken in conjunction with the accompanying drawings, wherein:

FIG. 1 is a side view of a parcel sortation system embodying the invention in its preferred form, with some parts broken away, and others shown schematically, for the purposes of clarity;

FIG. 4 is an enlarged view of a portion of the chute trap door operating mechanism shown in FIG. 3 with some parts broken away for the purpose of clarity;

FIG. 5 is a transverse vertical sectional view taken on the line 5—5 of FIG. 4;

FIG. 6 is a horizontal sectional view taken on the line 6—6 of FIG. 4;

FIGS. 7 to 9 are schematic views of portions of the chute trap door operating mechanism and the parcel depositing mechanism at different positions during the operating cycle;

FIG. 10 is a partial transverse vertical sectional view through the distributing conveyer;

FIG. 11 is a side view of a distributing conveyer bucket;

FIG. 12 is a transverse vertical sectional view taken on the line 12—12 of FIG. 11;

FIG. 13 is a longitudinal vertical section taken on the line 13—13 of FIG. 10;

FIG. 14 is an enlarged side view of the distributing bucket door closing cam with some parts broken away for purposes of clarity;

FIG. 17 is a schematic diagram of an electrical circuit which can be used to control the disclosed conveyer system.

GENERAL ARRANGEMENT

Figure 2:
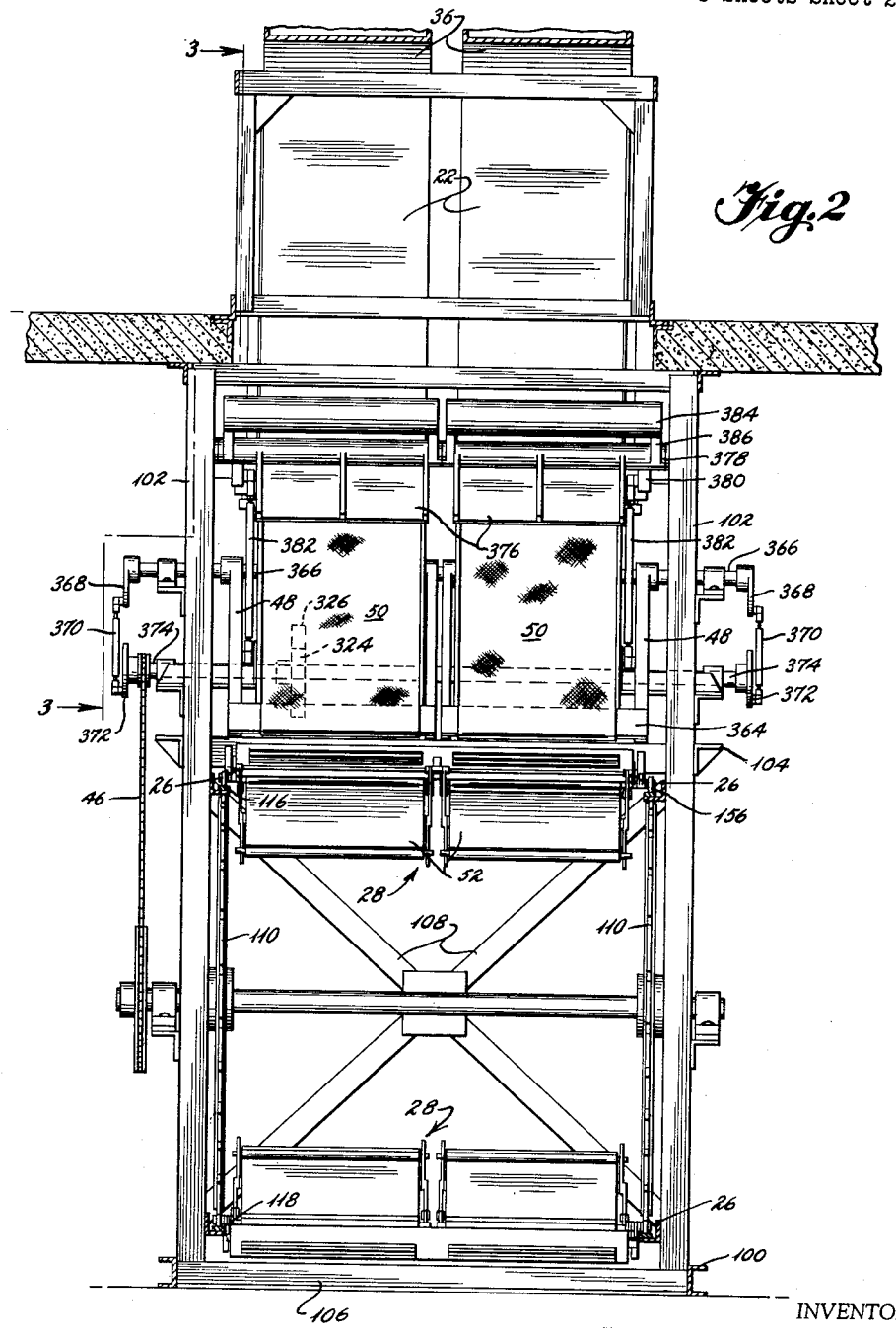
FIG. 2 is a transverse vertical sectional view taken on the line 2—2 of FIG. 1.

Referring primarily to FIGS. 1 and 2, a parcel sortation system embodying the invention includes a parcel loading station 20 located at an upper level with a chute 22 forming a part of the dispatch mechanism extending downwardly to one end of a distributing conveyer 24 located at a lower level. Each distributing conveyer 24 includes endless roller chains 26 carrying a plurality of buckets 28 for receiving articles from chute 22. Between the upper and lower runs of distributing conveyer 24 are a number of collecting conveyers 30 disposed transversely of the distributing conveyer 24 for receiving articles dropped from the distributing conveyer buckets.

A number of loading stations 20 and distributing conveyers 24 may be located side-by-side. The collecting conveyers 30 then pass beneath each of the distributing conveyers.

A suitable mechanism such as a delivery conveyer 34 and a slide 36 may be employed to deliver a parcel to the loading station 20 where the operator places each parcel on a pair of trap doors 38 at the top of chute 22 and operates a selected push button 40 on control panel 42 to open the trap doors 38 and dispatch the parcel to one of the collecting conveyers 30.

Figure 3:
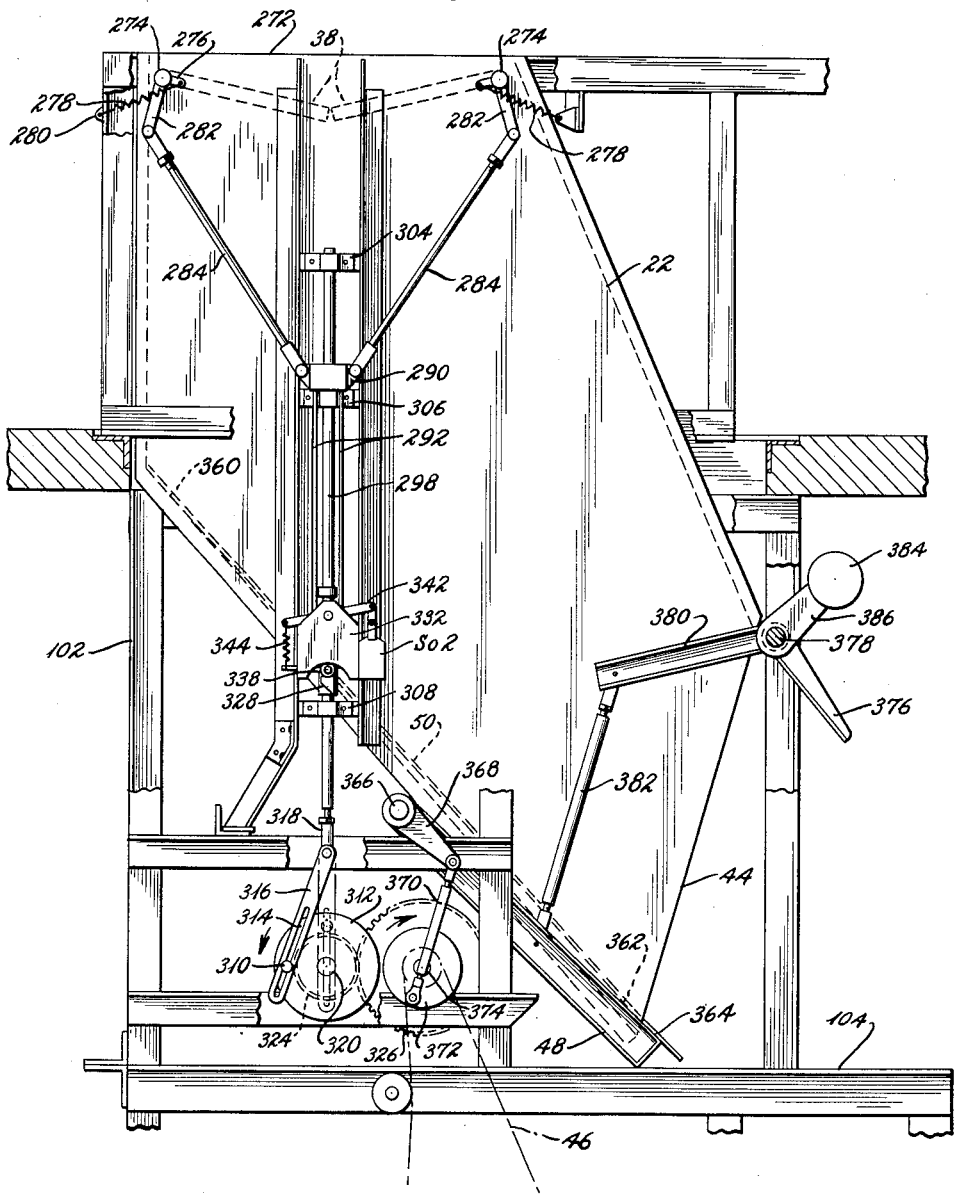
FIG. 3 is a longitudinal vertical sectional view taken on the line 3—3 of FIG. 2 and shows the operating mechanism for the chute trap doors and the parcel depositing mechanism.
Figure 15:
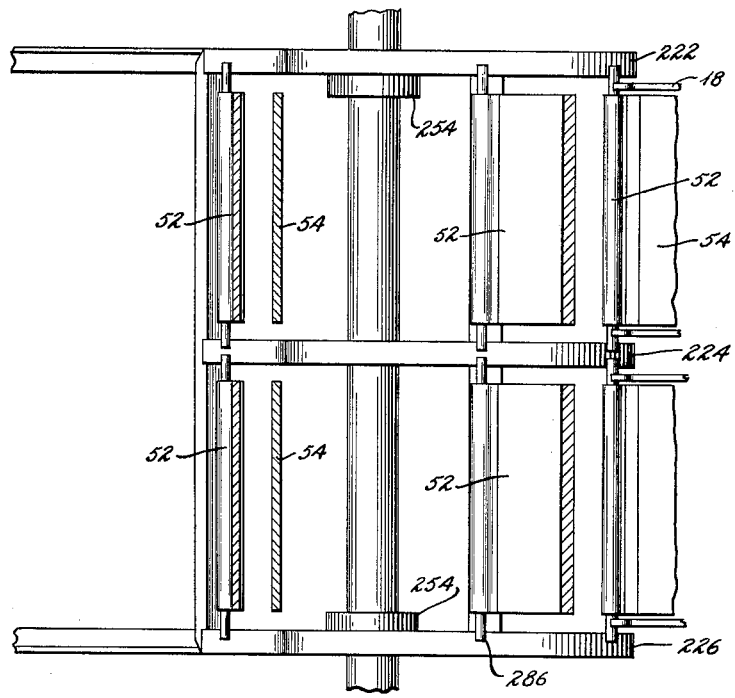
FIG. 15 is a horizontal section taken on the line 15—15 of FIG. 14.
Figure 16:
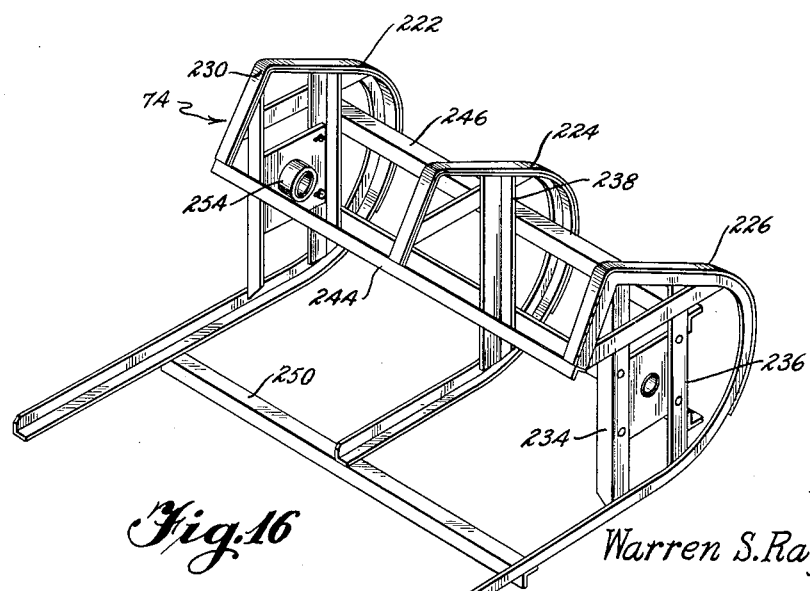
FIG. 16 is an enlarged isometric view of the bucket door closing cam.

At the bottom of the chute 22 is located an article depositing mechanism 44 driven by drive chain 46 in synchronization with the trap door operating mechanism and movement of buckets on a distributing conveyer. This mechanism includes a rocker arm 48 and a flexible web 50, such as plastic belting, which forms a cradle to catch a parcel in its upper position shown in FIG. 1, and which deposits the article onto the distributing conveyer in its lower position shown in FIG. 3.

Each distributing conveyer bucket 28 has a parcel discharge opening in its bottom which is closed by a pair of doors 52 and 54 normally retained by a latch mechanism 56 which includes a trip mechanism 58. A solenoid Sol at a desired collecting conveyer 30 is energized by the selection of proper push button 40 to drive a plunger 60 into the path of the trip mechanism 58 just before the bucket reaches that collecting conveyer. This opens the bucket doors and drops the parcel onto the collecting conveyer.

A control system 62 at each loading station includes a tracking belt 64 which carries a number of brushes 66 each of which corresponds to one of the buckets 28. Belt 64 is driven in synchronization with the distributing conveyer 24 so that each brush 66 passes a coding unit 70 as its associated bucket 28 passes article depositing mechanism 44. Unit 70 codes brush 66 in a pattern corresponding to one of the collecting conveyers 30 according to the button pressed by the operator. A number of fixed contacts 72, each corresponding to a collecting conveyer 30, are located to contact a brush 66 as an associated bucket passes over the associated collecting conveyer. The coded brush 66 closes an electrical circuit through a mating fixed contact 72 to energize solenoid Sol over the desired collecting conveyer to move plunger 60 into the path of the tripping mechanism 58 for opening the distributing conveyer bucket doors 52 and 54 of the selected collecting conveyer. A door closing cam assembly 74 is mounted at the end of the upper run of the distributing conveyer to close the doors of the buckets as they pass around the sprocket.

*Distributing Conveyer*

Each distributing conveyer has a frame 100 located beneath a pair of sorting stations 20 including posts 102 and a plurality of longitudinal horizontal beams 104 and transverse horizontal beams 106 welded together and suitably braced as by diagonal beams 108. A pair of sprocket wheels 110 are journaled for rotation on a transverse axis beneath the loading station and a second pair of sprocket wheels 112 journaled at the opposite end of the frame are driven by a motor 114. Spaced roller chains 26 entrained about sprocket wheels 110 and 112 have their upper runs supported by tracks 116 on angle members extending along opposite sides of the frame. Lower runs of chains 26 are supported by corresponding tracks 118.

Two rows of buckets 28 are mounted in side by side relationship between the two roller chains 26 on each frame to form two distributing conveyers. Each bucket is formed with a pair of side members 140 having generally V-shaped lower portions 142. A front plate 144 connects the front edges of four side members 140 and a rear plate 146 connects the rear edges to form two side by side buckets 28. (See FIG. 10.) Four hinges 148 for doors 52 and 54 which close the bucket bottom are mounted on each front plate 144 and rear plate 146.

A forward bracket 150 secured to the outer end of each front plate 144 carries a pivot pin 152 of roller chain 26. A plurality of links 154 are located between the brackets 150 of adjacent buckets and a roller 156 is rotatably mounted on each pivot pin 152. A link 158 is pivotally mounted to each bracket 150 at one end on the pin 152 and at its opposite end to a plate 160 which is secured to bracket 162 on the rear panel of an adjacent bucket 28. In this way the front end of each bucket is pivoted on the axis of a chain roller, and a link pivoted at the rear end of the bucket is pivoted at the axis of another roller.

A latch 180 pivoted at 182 on each side of bucket 28 has a notch 184 in its lower end to engage a transverse rod 186 secured to a flap 188 mounted on the forward door 52 of each bucket. Flap 188 overlaps the free edge of the rearward door 54 of the bucket to hold the rearward door closed when latched. A tension spring 190 secured to the upper end of latch 180 urges the latch in a latching direction. An adjustable link 192 pivotally connected to the upper end of latch 180 has its other end pivoted to a crank arm 194 fixed on a transverse shaft 196 which is journaled at its outer end in the bracket 150 on the outer side of the bucket. The inner end of shaft 196 is journaled in a bracket 198 mounted on forward plate 144 between the two buckets of adjacent distributing conveyers. A trip plunger engaging arm 200 is mounted on shaft 196 on the outer side of each bracket 150. Rollers 202 on the outer end of plungers 60 of each solenoid Sol above collecting conveyers 30 is projected into the path of the trip plunger engaging arm 200 to unlatch the buckets and discharge the contents on to a collecting conveyer.

At the end of the horizontal run of the distributing conveyor are three cams 222, 224 and 226 of the door closing assembly 74 to engage the latch catch rods 186 projecting from the sides of the doors of the buckets 28. The surface of each cam is covered with a length of strap iron 228 bent to form a shoulder portion 230 inclined upwardly toward the end of the conveyor to a level higher than front doors 52 swing to engage the catch rod 186. As best illustrated in FIG. 14, positioning portion 232 extends from the shoulder portion 230 downwardly over the axis of sprocket 112 to a closing portion which curves around the sprocket axis to move door 52 to a closed position after the bucket is partially inverted and rearward door 54 is closed by gravity. The latch 180, acting under the influence of spring 190, then engages latch catch rod 186 to hold the two doors closed.

Outside cams 222 and 226 are braced by vertical members 234 and 236 and by horizontal strap 238. Intermediate cam 224 is braced by a vertical member 240 and a horizontal strap 242. The three cams are connected by transverse members 244, 246, 248 and 250.

A plate 252 is fastened to vertical members 234 and 236 and has secured to it a bearing member 254 which receives the shaft of sprockets 112.

*Loading Station*

Above each distributing conveyer at each sorting station 20 is a table having an opening 272 through which parcels are dropped to chute 22. This opening is normally closed by a pair of trap doors 38 on to which parcels are placed at the beginning of the sorting operation. Doors 38 are pivoted on shafts 274 rotatively supported at the sides of opening 272. A crank arm 276 fastened to each shaft 274 is connected by a spring 278 to bracket 280 on the frame. Doors 38 are urged toward the open position by their own weight and by the force of spring 278. Another pair of crank arms 282 fixed to each shaft 274 are coupled by adjustable links 284 to an upper slide assembly and a door operating mechanism. The upper slide assembly includes an upper journal member 290 connected by a pair of vertical tie rods 292 to a lower journal member 294. Vertically aligned holes 296 in the upper and lower journal members 290 and 294 slidably receive a rod member 298 with a spring 300 coiled about the rod between a collar 302 and a lower journal member 294. Reciprocation of rod 298 in fixed bearing members 304, 306 and 308 is controlled by a crank pin 310 on driving disc 312 which slides in a slot 314 in a connecting rod 316 coupled by threaded nut 318 to the lower end of the rod 298.

Drive disc 312 is keyed to a shaft 320 journaled for rotation in the distributing conveyor frame 100. A gear 324 on shaft 320 is driven by the distributing conveyor through gear 326 and drive chain 46 of the parcel depositing mechanism 44. A latch abutment 328 is secured to the rods 298 immediately below the lower journal member 294 to engage a latch assembly 330 and hold the sliding rod 298 in lower position to prevent the door from opening. Latch assembly 330 includes a housing 332 fixed to the chute 22 and a horizontal pin 334 journaled for rotation within housing 332. A T-shaped latching member 336 fixed to the horizontal pin 334 has a roller 338 on the bottom of leg 340 to engage the latch abutment 328. Fastened to one end of the cross-arm 342 is a tension spring 344 connected to the chute at its other end to urge the latch to the latching position. A link 346 connects the other end of cross-arm 342 to the plunger 348 of a solenoid So2. When plunger 348 of solenoid So2 is shifted roller 338 releases latch abutment 328 so the doors open.

*Parcel Depositing Mechanism*

The bottom of chute 22 is formed by a plastic web 50 which has one end 360 fastened to the back of the chute. The other end 362 of the web is fastened to the free end 364 of rocker arm 48. Rocker arm 48 is pivotally mounted on the shaft 366 above the distributing conveyor for oscillating movement from an upper position in which web 50 forms a cradle to receive a parcel to a lower position from which the parcel is dropped into one of the buckets 28 on the distributing conveyor 24.

A crank 368 on shaft 366 is coupled to a connecting rod 370 of adjustable length which is connected to a drive disc 372 which is keyed on shaft 374 with gear 326. Gear 326 meshes with gear 324 of the chute trap door operating mechanism which has twice as many teeth. The trap door operating cycle therefore has a period one half of the period of the rocker arm operating cycle. Gears 326 and 324 are adjusted so that the trap doors are opened when the rocker arm is in the middle of its upstroke so that parcels reach the web 50 as it forms a cradle. Thereafter, web 50 straightens to a downwardly inclined position to deposit the parcel in a bucket of the conveyor.

A flap 376 pivotally mounted on horizontal shaft 378 at the top of the opening of the lower end of the chute extends down far enough to block the opening above cradled web 50 to prevent articles from bouncing through that opening after they fall on to web 62. This door 376 is mounted for synchronous movement with web 50 through crank arm 380 and link 382 which is adjustable in length. A counter-weight 384 on the end of an arm 386 on the door shaft 378 balances the off-center weight of the linkage system, and especially rocker arm 48 to prevent transmission of pulsations to the distributing conveyor through drive chain 82. Such pulsations arise from the inertia forces created through change in direction of oscillation, and also from the shock of packages hitting door 376. This weight reduces any tendency of door 376 or the linkage to move under such shock.

*Operation*

Distributing conveyor 24 is driven at constant speed by drive motor 114 and tracking assembly belt 64, drive disc 372 of the parcel depositing mechanism, and drive disc 312 of the chute trap door operating mechanism are driven in synchronization with distributing conveyor 24. The parcel depositing mechanism continuously oscillates rocker arms 48 and parcel depositing web 50 into parcel depositing position each time a bucket 28 on a distributing conveyor moves beneath the chute 22. Latch assembly 330 holds the chute trap door operating mechanism, and thus the chute trap doors, latched. Slot 314 in the connecting rod 316 permits continual rotation of pin 310 while the doors are latched in closed position.

The upper end of slot 314 extends slightly above the highest point reached by pin 310 during rotation of the drive disc 312 and the lower end of slot 314 is slightly above the lowest position reached by pin 310. Each time pin 310 reaches its lowest point it pulls connecting rod 316 and sliding rod 298 downwardly as can be seen in FIG. 9. Latch abutment 328 is therefore moved very slightly out of engagement with the latch assembly 330 once each cycle. This motion would cause flutter of the chute trap doors were it not for spring 300 which constantly urges the upper slide assembly 286 to its lowermost position in which the doors are tightly shut. Upper journal member 290 of the upper slide assembly 286 then rests against bearing 306 to provide a stop for the trap doors.

As articles are delivered to the sorting station, an operator observes the destination marked on the parcel, places the parcel on a trap door and actuates the selected push button 40a—40g which corresponds to the collecting conveyer selected by the operator. (See FIG. 17.) Push buttons 40a—40g are of the type which, upon depression, are latched until the latch is released by energization of a solenoid So20.

A limit switch LS1 is closed for a short time by a timing cam TC1 which is part of the tracking unit 210, as a bucket 110 approaches the parcel depositing mechanism. If one of the push buttons 40a—40g is depressed a timing relay TR1 is energized and a coding relay 70a—70g is energized to code the tracking brush 66 associated with that bucket. Energization of timing relay TR1 closes contacts TR1a to energize the latch solenoid So2 for the desired length of time. Gears 324, 326 cause the trap door operating mechanism to operate twice as often as the parcel depositing mechanism, but the shape of timing cam TC1 insures that the latch solenoid So2 is only energized when rocker arm 48 and flexible web 50 form a parcel cradle to catch the parcels.

Due to the weight of the door operating mechanism urging latch abutment 328 upwardly, it binds roller 338 and solenoid So2 cannot move latch assembly 330 out of latching position until pin 310, at the lowest point of its rotation, pulls sliding rod 298 and abutment 328 out of engagement with the latch assembly, as is shown in FIG. 9. As shown in FIG. 7, after the abutment becomes unlatched, pin 310 acting through sliding rod abutment 302, spring 300, upon lower journal member 294 still holds the trap doors 38 closed because the compressive force of spring 300 is greater than the door biasing forces. As pin 310 rises, spring 300 uncoils until its force equals the door opening forces. Upon further rising of pin 310 the trap doors gradually open. This controlled opening of the trap doors 38 gently lowers the parcel into the parcel depositing mechanism.

During assembly the position of sliding rod abutment 302 is varied to find a position where the compressive force of spring 300 is greater than the trap door opening forces when pin 310 is in its lowest position, but is low enough so that the trap doors can fully open when pin 310 is in its upper positions. A hole is then drilled through abutment 302 and rod 298 to receive the pin 303 which holds the abutment in the desired position.

As the trap door opens, a limit switch LS2 is closed by a timing cam TC2 to energize solenoid So20 to release the catch which holds the push buttons 40a—40g depressed. Opening of timing relay contacts TR1a deenergizes latch solenoid So2 so that when pin 310 next pulls the latch abutment 328 to its lowest position spring 344 returns latch assembly 330 to the latched position.

Rocker arm 48 lowers to deposit the parcel into the bucket. Durnig this parcel depositing operation, the operator can place another parcel on the now closed trap doors, depress another button 40a—40g, and when timing cam TC1 next closes limit switch LS1 the trap doors 38 again open and the brush 66 associated with the next bucket is coded for the selected collecting conveyer 30.

When a coded brush 66 reaches the sensing contact 72a—72g which it has been set to actuate, an electrical contact is closed to energize the solenoid So1a—So1g over the selected collecting conveyer and project a plunger 60 into the path of the tripping mechanism 58 of the distributing conveyer bucket latch mechanism. The parcel drops into the selected collecting conveyer 30a—30g and is carried away for further processing.

When the bucket reaches the door closing mechanism 74, the open doors 52 and 54 move between cams 224 and 226, or 222 and 224 as the case may be. Forward door 52 is closed after rearward door 54 has closed by gravity, and spring 190 then closes latches 180. The buckets can again receive a parcel when they next pass under chute 22.

Many modifications of this invention will suggest themselves to those skilled in the art, the preferred embodiment of the invention described and illustrated herein is to be construed as illustrative and not as limiting the invention.

What I claim is:

1. In a conveyer system having a plurality of movable article carriers and means for moving the carriers successively past a loading station, article dispatching apparatus comprising a table above the carriers having an opening therein, a trap door for closing said opening, a mechanical linkage for operating said door including a reciprocable member, a crank operated synchronously with movement of said article carriers, a connecting rod having a lost motion connection with said crank, a latch for engaging said rod to prevent movement thereof during rotation of said crank, and a resilient coupling between said member and said rod and means for releasing said latch to open and close the door under the control of said crank and said rod.

2. A conveyer system having a plurality of movable article carriers and means for moving the carriers successively past a loading station, article dispatching apparatus comprising a stop, means biasing the stop from a closed position blocking movement of the articles to the carriers to an unblocking position, linkage means fixed to the stop, reciprocable means mounted for movement between a first and a second position, latch means blocking movement of the reciprocable means from a latched position to the first position but not to the second position, selectively actuated means for releasing the latch means only when the reciprocable means is in the second position, resilient means engaged between the reciprocable means and the linkage means to urge the stop to the closed position and the reciprocable means to the first position when the reciprocable means is in either the latched or second position, but unstressed when the reciprocable means is in the first position, and oscillating means driven by the carrier moving means, and driving the reciprocable means through a lost motion connection to the second position once as each carrier passes the loading station, with the lost motion connection absorbing the oscillating means motion when the reciprocable means is latched, and blocking stop movement when unlatched except when a carrier will be positioned to receive an article.

3. In a conveyer system having a plurality of movable article carriers and means for moving the carriers successively past a loading station, article dispatching apparatus comprising a table above the carriers having an opening, a trap door for closing said opening, a flexible web beneath said opening for receiving articles, one end of said web being fixed and the other end secured to a rocker arm, first means operated synchronously with said carrier for moving said rocker arm vertically in a path to shift said web between an article receiving position cradled beneath said opening and a discharge position inclined toward the carriers, said first means including a driving disc and first gear operatively associated therewith, second means operated synchronously with movement of said carriers for opening and closing said door within a half-cycle of movement of said rocker arm said second means including a second gear associated with said first gear in a two to one ratio.

4. In a conveyer system having a plurality of movable article carriers and means for moving the carriers successively past a loading station, article dispatching apparatus comprising a table above the carriers having an opening therein, a trap door for closing said opening, a flexible web beneath said opening for receiving articles, one end of said web being fixed and the other fastened to a rocker arm, first means continuously operated synchronously with movement of said carriers for moving said rocker arm vertically to shift said web between an article receiving position cradled beneath said opening and a discharge position inclined toward the carriers, said first means including a driving disc and a first gear operatively associated therewith, means driven synchronously with and with at least twice the speed of said rocker arm for opening and closing said door, said second means including a second gear associated with and driven by said first gear, a latch for retaining said door in closed position, and means rendered effective during a portion of the movement of said rocker arm for releasing said latch.

References Cited in the file of this patent

UNITED STATES PATENTS

| 2,169,353 | Carroll | Aug. 15, 1939 |
| 2,194,381 | Cadman | Mar. 19, 1940 |
| 2,595,689 | Mitchell | May 6, 1952 |
| 2,615,557 | Hapman | Oct. 28, 1952 |
| 2,764,275 | Lens | Sept. 25, 1956 |

FOREIGN PATENTS

| 693,365 | Great Britain | July 1, 1953 |